(12) United States Patent
Wang et al.

(10) Patent No.: US 11,262,607 B2
(45) Date of Patent: Mar. 1, 2022

(54) LIQUID CRYSTAL ANTENNA AND MANUFACTURING METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Ying Wang, Beijing (CN); Xue Cao, Beijing (CN); Peizhi Cai, Beijing (CN); Zhifu Li, Beijing (CN); Hao Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 125 days.

(21) Appl. No.: 16/099,541

(22) PCT Filed: Mar. 29, 2018

(86) PCT No.: PCT/CN2018/081108
§ 371 (c)(1),
(2) Date: Nov. 7, 2018

(87) PCT Pub. No.: WO2018/205764
PCT Pub. Date: Nov. 15, 2018

(65) Prior Publication Data
US 2019/0146248 A1    May 16, 2019

(30) Foreign Application Priority Data
May 9, 2017  (CN) .......................... 201710322058.1

(51) Int. Cl.
*G02F 1/13* (2006.01)
*G02F 1/1339* (2006.01)
(Continued)

(52) U.S. Cl.
CPC .............. *G02F 1/1313* (2013.01); *G01S 1/00* (2013.01); *G02F 1/13394* (2013.01);
(Continued)

(58) Field of Classification Search
CPC ......... H01Q 21/06; H01Q 3/34; H01Q 9/0407
See application file for complete search history.

(56) References Cited

U.S. PATENT DOCUMENTS

2004/0183214 A1* 9/2004 Partridge ............ B81C 1/00293
257/787
2006/0027020 A1* 2/2006 Ocansey ............... B81B 3/0005
73/514.01
(Continued)

FOREIGN PATENT DOCUMENTS

CN   105552535 A   5/2016
CN   106299627 A   1/2017
(Continued)

OTHER PUBLICATIONS

International Search Report of PCT/CN2018/081108 in Chinese, dated Jul. 6, 2018, with English translation.
(Continued)

*Primary Examiner* — Alexander P Gross
(74) *Attorney, Agent, or Firm* — Collard & Roe, P.C.

(57) ABSTRACT

A liquid crystal antenna and a manufacturing method thereof are disclosed. The liquid crystal antenna includes: an antenna array including a first substrate and a second substrate arranged opposite to each other and configured to change a phase of an electromagnetic wave signal fed into the liquid crystal antenna to transmit or receive a beam in a
(Continued)

preset direction; and an inertial navigation element configured to determine a motion parameter of the liquid crystal antenna in a navigation coordinate system, the inertial navigation element is disposed on a side of the second substrate facing the first substrate; and the antenna array adjusts the preset direction according to the motion parameter acquired by the inertial navigation element.

15 Claims, 4 Drawing Sheets

(51) Int. Cl.
| | | |
|---|---|---|
| *H01Q 21/06* | (2006.01) | |
| *H01Q 1/36* | (2006.01) | |
| *G02F 1/1343* | (2006.01) | |
| *H01Q 3/34* | (2006.01) | |
| *H01Q 3/44* | (2006.01) | |
| *H01Q 9/04* | (2006.01) | |
| *G01S 1/00* | (2006.01) | |

(52) U.S. Cl.
CPC .......... *G02F 1/13439* (2013.01); *H01Q 1/36* (2013.01); *H01Q 1/364* (2013.01); *H01Q 3/34* (2013.01); *H01Q 3/44* (2013.01); *H01Q 9/0442* (2013.01); *H01Q 21/061* (2013.01); *H01Q 21/065* (2013.01)

(56) References Cited

U.S. PATENT DOCUMENTS

| | | | |
|---|---|---|---|
| 2008/0123044 A1* | 5/2008 | Oh | G02F 1/136227 349/187 |
| 2008/0150798 A1* | 6/2008 | Curry | H01Q 1/18 342/359 |
| 2009/0128529 A1* | 5/2009 | Izumi | G02F 1/13318 345/207 |
| 2015/0147965 A1 | 5/2015 | Ali et al. | |
| 2015/0380789 A1* | 12/2015 | Jakoby | H01Q 9/0407 343/905 |
| 2017/0269120 A1* | 9/2017 | Yang | G01P 15/006 |
| 2019/0229431 A1* | 7/2019 | Asagi | H01L 27/124 |
| 2020/0136696 A1* | 4/2020 | El-Rayis | G01S 1/045 |

FOREIGN PATENT DOCUMENTS

| | | |
|---|---|---|
| CN | 106450765 A | 2/2017 |
| CN | 206134947 U | 4/2017 |
| CN | 106932933 A | 7/2017 |

OTHER PUBLICATIONS

Notice of Transmittal of the International Search Report of PCT/CN2018/081108 in Chinese, dated Jul. 6, 2018.

Written Opinion of the International Searching Authority of PCT/CN2018/081108 in Chinese, dated Jul. 6, 2018 with English translation.

* cited by examiner

LIQUID CRYSTAL ANTENNA AND MANUFACTURING METHOD THEREOF

CROSS REFERENCE

This application is the National Stage of PCT/CN2018/081108 filed on Mar. 29, 2018, which claims priority under 35 U.S.C. § 119 of Chinese Application No. 201710322058.1 filed on May 9, 2017, the disclosure of which is incorporated by reference.

TECHNICAL FIELD

Embodiments of the present disclosure relate to a liquid crystal antenna and a manufacturing method thereof.

BACKGROUND

Liquid crystal antenna refers to an adaptive antenna which can automatically adjust a weight vector of each antenna array element to a signal in a certain direction according to a specific receiving criterion, so as to transmit or receive a beam in a preset direction, and align the main lobe direction with a useful signal, and meanwhile, align the low side lobe or the null steering direction with the interference signal direction, and hence can achieve the purpose of "spatial filtering".

Inertial navigation system is an autonomous navigation system that does not rely on external information and does not radiate energy to the outside. A gyroscope and an accelerometer are used as sensing devices of a navigation parameter solving system. The system establishes a navigation coordinate system according to the output of the gyroscope, and calculates the speed and the position of a carrier in the navigation coordinate system according to the output of the accelerometer.

SUMMARY

At least an embodiment of the present disclosure provides a liquid crystal antenna, including: an antenna array, including a first substrate and a second substrate arranged opposite to each other and configured to change a phase of an electromagnetic wave signal fed into the liquid crystal antenna to transmit or receive beams in a preset direction; and at least one inertial navigation element, configured to determine a motion parameter of the liquid crystal antenna in a navigation coordinate system, the inertial navigation element is on a side of the second substrate facing the first substrate, and the antenna array is configured to adjust the preset direction according to the motion parameter acquired by the inertial navigation element.

For example, in the liquid crystal antenna provided by an embodiment of the present disclosure, the liquid crystal antenna includes: a seed layer between the second substrate and the inertial navigation element.

For example, in the liquid crystal antenna provided by an embodiment of the present disclosure, the inertial navigation element includes: at least one accelerometer configured to detect an acceleration of a translational motion of the liquid crystal antenna in a 3D direction and determine a translational motion parameter of the liquid crystal antenna.

For example, in the liquid crystal antenna provided by an embodiment of the present disclosure, the inertial navigation element further includes: at least one gyroscope, configured to measure a rotational motion parameter of the liquid crystal antenna in the 3D direction.

For example, in the liquid crystal antenna provided by an embodiment of the present disclosure, the inertial navigation element is in a peripheral region surrounding the antenna array.

For example, in the liquid crystal antenna provided by an embodiment of the present disclosure, the antenna array further includes: a first electrode, a first alignment layer, a liquid crystal layer, a second alignment layer and a second electrode which are disposed between the second substrate and the first substrate and sequentially arranged along a direction from the first substrate to the second substrate, and a plurality of patch elements arranged in a matrix and disposed on a side of the first substrate away from the second substrate or a side of the second substrate away from the first substrate.

For example, in the liquid crystal antenna provided by an embodiment of the present disclosure, the antenna array further includes spacers disposed between the first substrate and the second substrate, for supporting between the first alignment layer and the second alignment layer.

For example, in the liquid crystal antenna provided by an embodiment of the present disclosure, the first electrode includes a plurality of first sub electrodes; and the second electrode includes a plurality of second sub electrodes.

For example, in the liquid crystal antenna provided by an embodiment of the present disclosure, materials of the patch elements, the first electrode and the second electrode are high-conductivity metallic materials.

For example, in the liquid crystal antenna provided by an embodiment of the present disclosure, each of the patch elements has a rectangular shape.

For example, in the liquid crystal antenna provided by an embodiment of the present disclosure, the antenna array has a shape selected from the group consisting of circular array, square array and octagonal array.

At least an embodiment of the present disclosure provides a manufacturing method of an liquid crystal antenna, the liquid crystal antenna includes any one of the abovementioned liquid crystal antennas, the manufacturing method includes: forming the antenna array by a semiconductor manufacturing process; and forming the inertial navigation element on the side of the second substrate facing the first substrate by a semiconductor manufacturing process and a sacrifice layer process.

For example, in the manufacturing method of the liquid crystal antenna provided by an embodiment of the present disclosure, forming the inertial navigation element on the side of the second substrate facing the first substrate by a semiconductor manufacturing process and a sacrifice layer process includes: forming a stacked structure on the side of the second substrate facing the first substrate by the semiconductor manufacturing process, in which the stacked structure includes a sacrifice layer and a plurality of layers of the inertial navigation element, and the sacrifice layer is disposed among the plurality of layers; and removing the sacrifice layer and forming a cavity to form the inertial navigation element.

For example, in the manufacturing method of the liquid crystal antenna provided by an embodiment of the present disclosure, removing the sacrifice layer and forming a cavity to form the inertial navigation element includes: etching the sacrifice layer by a wet etching process to form the cavity.

For example, the manufacturing method of the liquid crystal antenna provided by an embodiment of the present disclosure further includes: forming a seed layer between the second substrate and the inertial navigation element.

For example, in the manufacturing method of the liquid crystal antenna provided by an embodiment of the present disclosure, the material of the sacrifice layer includes one or more selected from the group consisting of silicon nitride, silicon oxide and silicon oxynitride.

BRIEF DESCRIPTION OF THE DRAWINGS

In order to clearly illustrate the technical solution of embodiments of the present disclosure, the drawings of the embodiments or related technical description will be briefly described in the following; it is obvious that the drawings in the description are only related to some embodiments of the present disclosure and not limited to the present disclosure.

DETAILED DESCRIPTION

Figure 1A:
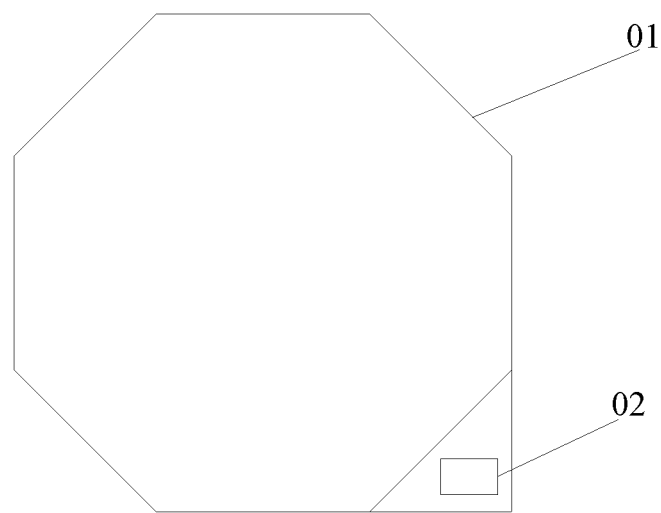
FIG. 1a is a schematic plan view of a liquid crystal antenna provided by an embodiment of the present disclosure.

In order to make objects, technical details and advantages of the embodiments of the present disclosure apparently, the technical solutions of the embodiments will be described in a clearly and fully understandable way in connection with the drawings related to the embodiments of the present disclosure. It is obvious that the described embodiments are just a part but not all of the embodiments of the present disclosure. Based on the described embodiments herein, a person having ordinary skill in the art may obtain other embodiment(s), without any inventive work, which should be within the scope of the disclosure.

Unless otherwise defined, the technical terms or scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "include," "including," etc., are intended to specify that the elements or the objects stated before these terms encompass the elements or the objects and equivalents thereof listed after these terms, but do not preclude the other elements or objects. The phrases "connect," "connected," etc., are not intended to define a physical connection or mechanical connection, but may include an electrical connection, directly or indirectly.

In study, inventor(s) of the present application has noticed that: in the current antenna system, an antenna and an inertial navigation system are two independent modules and must be respectively designed, manufactured and encapsulated and then integrated, so the antenna system has large volume and cannot satisfy the demands of light and thin design and miniaturization of various kinds of electronic products.

In addition, the inertial navigation system in the antenna system belongs to a platform inertial navigation system, which needs to establish an inertial coordinate system, and needs to compensate through backend calculation according to the influence of the earth rotation, the gravity acceleration and other factors. Because the antenna and the inertial navigation system are two independent modules, the position and the motion state of the inertial navigation system cannot perfectly reflect the position and the motion state of the antenna, there is still room for improving the efficiency and the precision of the antenna system.

Embodiments of the present disclosure provide a liquid crystal antenna and a manufacturing method thereof. The liquid crystal antenna includes an antenna array including a first substrate and a second substrate arranged opposite to each other and configured to change a phase of an electromagnetic wave signal fed into the liquid crystal antenna to transmit or receive a beam in a preset direction; and at least one inertial navigation element configured to determine a motion parameter of the liquid crystal antenna in a navigation coordinate system, in which the inertial navigation element is disposed on a side of the second substrate facing the first substrate, and the antenna array adjusts the preset direction according to the motion parameter acquired by the inertial navigation element. Therefore, the liquid crystal antenna integrates the antenna array and the inertial navigation element, and hence can achieve the light and thin design and the miniaturization of the liquid crystal antenna, and moreover, can also improve the efficiency and the precision of the liquid crystal antenna.

Figure 1B:
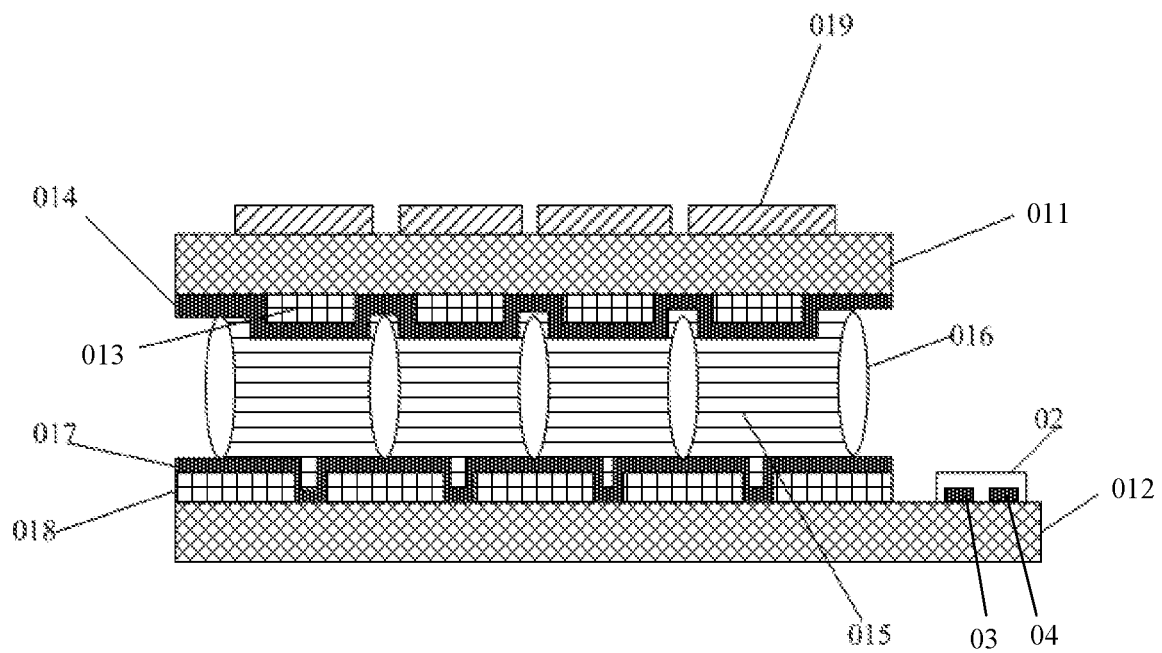
FIG. 1b is a schematic structural diagram of a liquid crystal antenna provided by an embodiment of the present disclosure.

An embodiment of the present disclosure provides a liquid crystal antenna. FIG. 1a is a schematic plan view of the liquid crystal antenna provided by an embodiment of the present disclosure. FIG. 1b is a schematic structural diagram of the liquid crystal antenna provided by an embodiment of the present disclosure. As illustrated by FIGS. 1a and 1b, the liquid crystal antenna includes: an antenna array 01 and at least one inertial navigation element 02.

As illustrated by FIG. 1b, the antenna array 01 includes a first substrate 011 and a second substrate 012 which are oppositely arranged, and is configured to change a phase of an electromagnetic wave signal of the liquid crystal antenna to transmit or receive a beam in a preset direction. For example, the preset direction is a direction in which an interactive target is located. The inertial navigation element 02 is disposed on a side of the second substrate 012 facing the first substrate 011. The inertial navigation element 02 can determine a motion parameter of the liquid crystal antenna in a navigation coordinate system. The inertial navigation element 02 is communicated with the antenna array 01, and the antenna array 01 adjusts the preset direction according to the motion parameter acquired by the inertial navigation element 02.

In the liquid crystal antenna provided by the embodiment of the present disclosure, because the inertial navigation element is on a side of the second substrate facing the first substrate, the inertial navigation element and the antenna array are well integrated together. The position and the motion state of the inertial navigation system can perfectly reflect the position and the motion state of the liquid crystal antenna. Thus, upon a carrier employing the liquid crystal antenna moving, because the inertial navigation element can determine the motion parameter of the liquid crystal antenna in the navigation coordinate system and the inertial navigation element and the antenna array are communicated with each other, the preset direction is rapidly adjusted according to the actual motion parameter of the antenna array provided by the inertial navigation system and the status information of the interactive target, so that the antenna array can quickly align with the interactive target. Thus, accurate alignment can be achieved, and then the precision and the efficiency of the liquid crystal antenna can be improved. Moreover, because deflection of liquid crystal can be continuously adjusted, a continuous variation of an antenna pattern can be achieved, so that a full-angle electronically controlled scanning can be achieved, and a fast tracking of the interactive target can be achieved. In addition, because the inertial navigation element is passive, the inertial navigation element is not interfered by the antenna signal of the antenna array; meanwhile, the inertial navigation element does not affect the performances of the liquid crystal antenna such as signal transmitting and receiving, filtering and beam control.

For example, in some examples, as illustrated by FIG. 1a, the inertial navigation element 02 is disposed in a peripheral region surrounding the antenna array 01.

For example, in some examples, as illustrated by FIG. 1b, the liquid crystal antenna further includes: a seed layer 021 between the second substrate 012 and the inertial navigation element 02. The seed layer 021 can provide a good bonding and conductive substrate environment for the growth process of subsequent metal layers of the inertial navigation element 02, and hence improve the bonding force between the substrate and the metal wiring layers.

For example, in the liquid crystal antenna provided by the embodiment of the present disclosure, as illustrated by FIG. 1b, the antenna array 01 may include: a first electrode 013, a first alignment layer 014, a liquid crystal layer 015, a second alignment layer 017 and a second electrode 018 which are sequentially disposed between the second substrate 012 and the first substrate 011 and along a direction from the first substrate 011 to the second substrate 012, and a plurality of patch elements 019 arranged in a matrix and disposed on a side of the first substrate 011 away from the second substrate 012 or a side of the second substrate 012 away from the first substrate 011 (FIG. 1b takes a case where the patch elements are disposed on the first substrate as an example).

For example, in some examples, the liquid crystal antenna further includes: spacers 016, and the spacers 016 are configured for supporting between the first alignment layer 014 and the second alignment layer 017.

Figure 2:
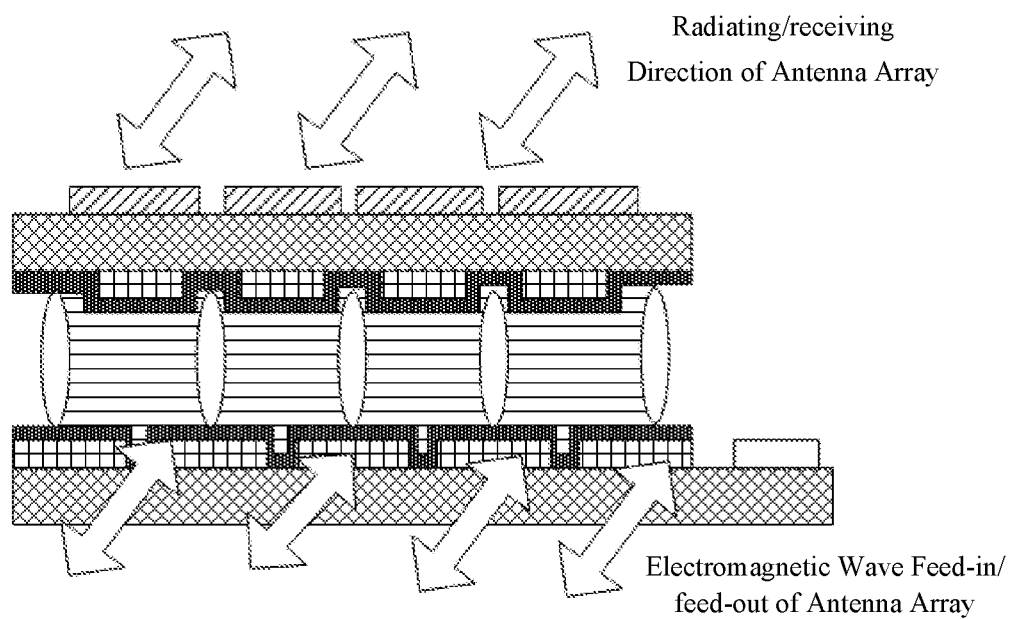
FIG. 2 is a schematic diagram illustrating a working principle of a liquid crystal antenna provided by an embodiment of the present disclosure.

FIG. 2 is a schematic diagram illustrating a working principle of a liquid crystal antenna provided by an embodiment of the present disclosure. As illustrated by FIG. 2, deflection state of liquid crystals can be controlled by applying different voltage signals, so that fed waves can form a certain phase difference; upon an electromagnetic wave signal in a feeding network radiating outwards from the patch elements after running through the adjusted liquid crystal layer, electromagnetic waves will be mutually coupled in an outer space to form a main beam in a preset direction, so as to complete the transmission of the electromagnetic signal. Similarly, the fed wave signals can be fed in from the patch elements; deflection state of liquid crystals can be controlled by applying different voltages; and after external electromagnetic wave signals run through the adjusted liquid crystal cell, it is ensured that the external electromagnetic wave signals can be fully received in a preset direction and finally transmitted to the feeding network, so as to complete the receiving of the electromagnetic signals. Upon a carrier employing the liquid crystal antenna moving, because the inertial navigation element can determine the motion parameter of the liquid crystal antenna in the navigation coordinate system and the inertial navigation element and the antenna array are communicated with each other, the preset direction can be rapidly adjusted by the change of the applied voltage signal according to the actual motion parameter of the antenna array and the status information of the interactive target, so as to quickly align with the interactive target. Thus, accurate alignment can be achieved, and then the precision and the efficiency of the liquid crystal antenna can be improved. Moreover, because the deflection of the liquid crystals can be continuously adjusted, a continuous variation of a directional diagram of the antenna can be achieved, thus, so that a full-angle electronically controlled scanning can be achieved, and a fast tracking of the interactive target can be achieved. In addition, because the inertial navigation element is passive, the inertial navigation element is not interfered by the antenna signal of the antenna array; meanwhile, the inertial navigation element does not affect the performances of the liquid crystal antenna such as signal transmitting and receiving, filtering and beam control.

For example, in some examples, the materials of the patch elements, the first electrode and the second electrode are high-conductivity metallic materials. For example, in the liquid crystal antenna provided by the embodiment of the present disclosure, upper and lower electrodes (corresponding to the first electrode and the second electrode) and the patch elements are metallic structures; and the metallic structure is implemented by a semiconductor process such as sputtering, evaporation or electroplating by adoption of a high-conductivity metal layer such as gold, aluminum or copper, namely the upper and lower electrodes and the patch elements can be manufactured by an existing semiconductor manufacturing process.

For example, in some examples, the patch element may have a rectangular shape, a circular shape or other shapes satisfying the design demands, which is not limited thereto.

For example, in some examples, as illustrated by FIG. 1b, the inertial navigation element 021 includes at least one accelerometer 03. The accelerometer 03 can detect an acceleration of a translational motion of the liquid crystal antenna in a 3D direction and determine a translational motion parameter of the liquid crystal antenna. For example, the accelerometer can measure a translational motion state of the liquid crystal antenna, detect the accelerations of the translational motions in three directions, so as to obtain a speed and a distance by integrating the time, so as to further achieve the measurement of parameters such as attitude, position and speed of the liquid crystal antenna, and give parameters of the motion state of the liquid crystal antenna.

For example, the accelerometer may be any one or more selected from the group consisting of a piezoelectric accelerometer, a piezoresistive accelerometer, a capacitive accelerometer, a resonant accelerometers and a tunnel accelerometer.

For example, in some examples, as illustrated by FIG. 1b, the inertial navigation element 02 further includes at least one gyroscope 04. The gyroscope 04 can measure a rotational motion parameter of the liquid crystal antenna in a 3D direction. The gyroscope is configured to measure rotational motions of the liquid crystal antenna in three directions, for example, attitude parameters such as attitude angle (pitch angle, roll angle and yaw angle), angular displacement or angular position are used for forming a navigation coordinate system; in this way, a measuring axis of the accelerometer is stabilized in the coordinate system, and the yaw and the attitude angle are given, thereby enriching the parameters of the motion state of the liquid crystal antenna and further improving the accuracy of the liquid crystal antenna.

For example, the gyroscope may be any one or more selected from the group consisting of a piezoelectric type detection gyroscope, a piezoresistive type detection gyroscope, a capacitance type detection gyroscope, an optical detection gyroscope or a tunnel effect detection gyroscope.

It should be noted that both the accelerometer and the gyroscope may be manufactured by a semiconductor process, which is compatible with the manufacturing process of the antenna array; the manufacturing sequence of the antenna array, the accelerometer and the gyroscope is not limited herein; and the antenna array, the accelerometer and the gyroscope can also be synchronously manufactured.

Because both the conventional accelerometer and the conventional gyroscope need to use a certain motion space to achieve the detection of various motion parameters, the inertial navigation element may be formed by firstly forming a stacked structure by a semiconductor manufacturing process, in which the stacked structure includes a sacrifice layer and a plurality of layers of the inertial navigation element, and at least partially removing the sacrifice layer and forming a cavity, subsequently. The cavity can provide the motion space needed by the accelerometer and the gyroscope.

Figure 3A:
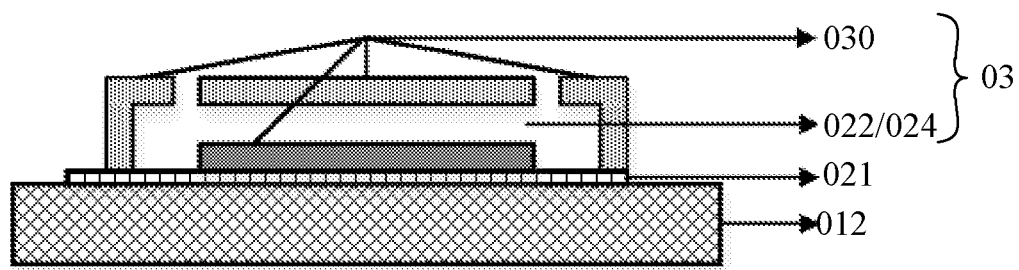
FIG. 3a is a schematic structural diagram of an inertial navigation unit provided by an embodiment of the present disclosure.
Figure 3B:
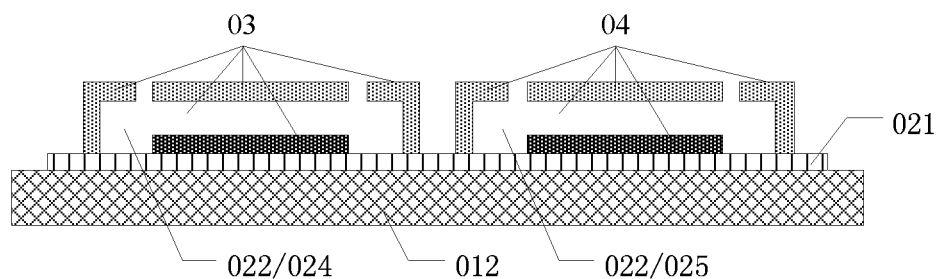
FIG. 3b is a schematic structural diagram of another inertial navigation unit provided by an embodiment of the present disclosure.

FIG. 3a is a schematic structural diagram of an inertial navigation element in an embodiment of the present disclosure. FIG. 3b is a schematic structural diagram of another inertial navigation element in an embodiment of the present disclosure. As illustrated by FIG. 3a, the inertial navigation element includes an accelerometer 03; a plurality of layers 030 (for example, a plurality of metal layers) of the accelerometer 03 and a sacrifice layer 022 are stacked on the seed layer 021; the sacrifice layer 022 may be used for forming a cavity with a micromechanical structure or a movable sensor structure; and the sacrifice layer only acts as a separation layer, and can be removed by a release process after the layers thereon are formed, so as to form a cavity 024, and then form a 3D structure of the inertial navigation element 02. It should be noted that upon the sacrifice layer 022 being removed, the sacrifice layer 022 at the position of the accelerometer 03 is converted into the cavity 024.

For example, the sacrifice layer is formed among the plurality of layers; and the cavity can be formed after the sacrifice layer is removed.

For example, in some examples, as illustrated by FIG. 3b, the inertial navigation element includes an accelerometer 03 and a gyroscope 04. The structures of the gyroscope 04 and the accelerometer 03 are similar. A plurality of layers (for example, a plurality of metal layers) of the accelerometer 04 may also be stacked on the seed layer 021 together with a sacrifice layer 022; the sacrifice layer 022 may be used for forming a cavity with a micromechanical structure or a movable sensor structure; and the sacrifice layer 022 only acts as a separation layer, and can be removed by a release process after the layers thereon are formed, so as to form a cavity 025, and then form a 3D structure of the inertial navigation element 02. It should be noted that upon the sacrifice layer 022 being removed, the sacrifice layer 022 at the position of the gyroscope 04 is converted into the cavity 025.

Figure 4A:
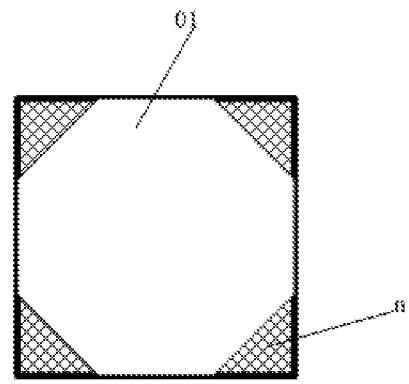
FIGS. 4a-4c are respectively schematic diagrams illustrating a shape of an antenna array provided by an embodiment of the present disclosure.
Figure 4B:
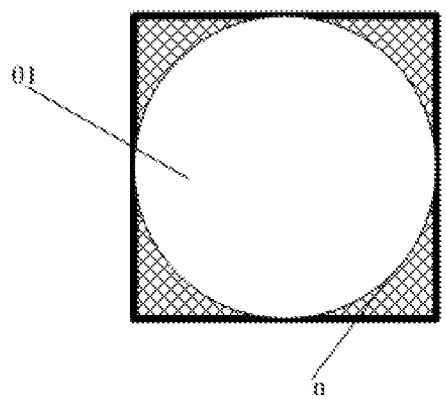
Figure 4C:
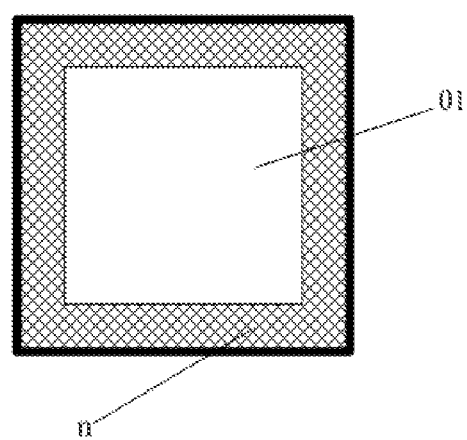

For example, in some examples, as illustrated by FIGS. 4a-4c, the antenna array 01 may have a shape of any one selected from the group consisting of a circular array as illustrated by FIG. 4b, a square array as illustrated by FIG. 4c and an octagonal array as illustrated by FIG. 4a; and the inertial navigation element is disposed in a peripheral area (corresponding to a shadow region n in FIGS. 4a-4c) surrounding the antenna array. For example, the inertial navigation elements are integrated in a peripheral region surrounding the antenna array or at four corners of the antenna array, may be integrated into one set of inertial navigation element, and may also be integrated into a plurality of sets of inertial navigation elements. The plurality of sets of inertial navigation elements navigate cooperatively, so that navigation accuracy can be higher. Moreover, the inertial navigation element is passive, is not interfered by the antenna signal, and meanwhile, the inertial navigation element will not affect the performances of the antenna array such as signal transmitting and receiving, filtering and beam control.

Figure 5:
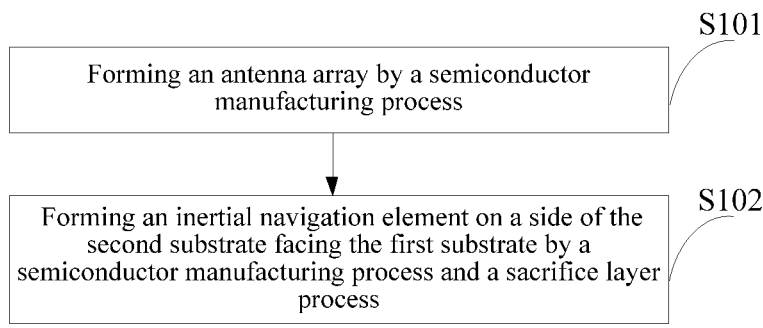
FIG. 5 is a flowchart of a manufacturing method of a liquid crystal antenna, provided by an embodiment of the present disclosure.

Based on the same invention concept, an embodiment of the present disclosure provides a manufacturing method of the liquid crystal antenna. As illustrated by FIG. 5, the manufacturing process includes:

S101: forming an antenna array by a semiconductor manufacturing process, in which the antenna array includes a first substrate and a second substrate which are arranged opposite to each other; and S102: forming an inertial navigation element on a side of the second substrate facing the first substrate by a semiconductor manufacturing process and a sacrifice layer process.

In the manufacturing process provided by the embodiment of the present disclosure, the antenna array and the inertial navigation element are formed by the semiconductor manufacturing process, which facilitates the integration of the antenna system. Because the manufacturing processes of the antenna array and the inertial navigation element are the same, the integrated production of the liquid crystal antenna can be achieved. It should be noted that the semiconductor manufacturing process includes deposition, coating, sputtering, patterning, and printing. The patterning process may include processes such as exposure, development and etching.

For example, in some examples, the step of forming the inertial navigation element on the side of the second substrate facing the first substrate by the semiconductor manufacturing process and the sacrifice layer process includes: forming a stacked structure on the side of the second substrate facing the first substrate by the semiconductor manufacturing process, in which the stacked structure includes a sacrifice layer and a plurality of layers of the inertial navigation element; and removing the sacrifice layer and forming a cavity to form the inertial navigation element. Thus, the inertial navigation element requiring a motion space can be formed by the semiconductor manufacturing process by forming the sacrifice layer.

In the manufacturing process provided by the embodiment of the present disclosure, in order to achieve the 3D structure of the inertial navigation element, the sacrifice layer must be added. The sacrifice layer is used for forming a cavity with a micromechanical structure or a movable sensor structure. Because the sacrifice layer only acts as a separation layer, the sacrifice layer can be removed by a release process after structures thereon are formed. In other words, in the process of manufacturing the inertia navigation unit, various layer structures are formed at first and the various layer structures include the sacrifice layer formed at a proper position, and then the sacrifice layer is removed by chemical etchant etching or dry etching, without damaging other layer structures, and finally the 3D structure of the inertial navigation element is obtained.

For example, in some examples, the step of removing the sacrifice layer and forming a cavity to form the inertial navigation element includes: forming the cavity by a wet etching process.

For example, in some examples, the manufacturing process further includes: forming a seed layer between the second substrate and the inertial navigation element.

In the manufacturing process provided by the embodiment of the present disclosure, in order to form the functional layers of the inertial navigation element on a glass substrate, the seed layer must be deposited. The seed layer may provide a good bonding and conductive substrate environment for the growth process of subsequent metal layers of the inertial navigation element, and hence improve the bonding force between the substrate and the metal wiring layers. That is to say, after the seed layer is previously grown on the substrate, a main metal layer structure of the inertial navigation element is grown subsequently.

For example, in the manufacturing method of the liquid crystal antenna provided by an embodiment of the present disclosure, the material of the sacrifice layer includes one or more selected from the group consisting of silicon nitride, silicon oxide and silicon oxynitride.

Figure 6:
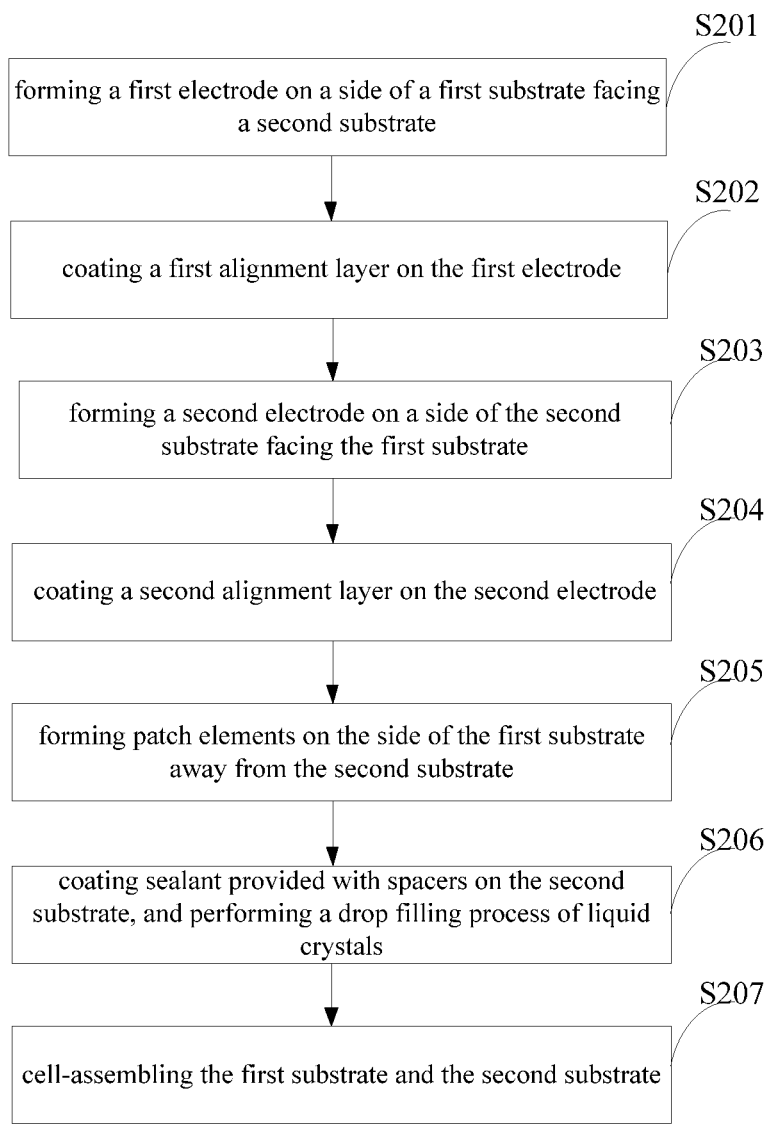
FIG. 6 is a flowchart of a manufacturing method of an antenna array in an embodiment of the present disclosure.

For example, in some examples, as illustrated by FIG. 6, the step S101 may include:

S201: forming a first electrode on a side of a first substrate facing a second substrate;

S202: coating a first alignment layer on the first electrode;

S203: forming a second electrode on a side of the second substrate facing the first substrate;

S204: coating a second alignment layer on the second electrode;

S205: forming patch elements on the side of the first substrate away from the second substrate;

S206: coating sealant provided with spacers on the second substrate, and performing a drop filling process of liquid crystals; and S207: cell-assembling the first substrate and the second substrate.

For example, in the manufacturing process provided by the embodiment of the present disclosure, the liquid crystal cell part (the upper second substrate, the alignment layers and the liquid crystals) of the antenna array has a manufacturing process similar to that of a conventional liquid crystal display (LCD) panel, and can be manufactured by slightly modifying the production line of the LCD panel.

Obviously, various modifications and variations may be made to the present disclosure by those skilled in the art without departing from the spirit and the scope of the present disclosure. Thus, if the modifications and the variations of the present disclosure fall within the scope of the claims of the present disclosure and equivalent technologies thereof, the present disclosure is also intended to cover such modifications and the variations.

What is claimed is:

1. A liquid crystal antenna, comprising:
   an antenna array, comprising a first substrate and a second substrate arranged opposite to each other and configured to change a phase of an electromagnetic wave signal fed into the liquid crystal antenna to transmit or receive a beam in a preset direction; and
   a plurality of inertial navigation elements, configured to determine a motion parameter of the liquid crystal antenna in a navigation coordinate system,
   wherein the plurality of inertial navigation elements are on a side of the second substrate facing the first substrate, and the antenna array is configured to adjust the preset direction according to the motion parameter acquired by the plurality of inertial navigation elements,
   orthographic projection of the plurality of inertial navigation elements on the second substrate is not overlapped with an orthographic projection of the first substrate on the second substrate,
   the plurality of inertial navigation elements are integrated in a peripheral region at four corners of the antenna array, and integrated into a plurality of sets of inertial navigation elements.

2. The liquid crystal antenna according to claim 1, further comprising:
   a seed layer between the second substrate and the plurality of inertial navigation elements.

3. The liquid crystal antenna according to claim 1, wherein the plurality of inertial navigation elements comprises: at least one accelerometer configured to detect an acceleration of a translational motion of the liquid crystal antenna in a 3D direction and determine a translational motion parameter of the liquid crystal antenna.

4. The liquid crystal antenna according to claim 3, wherein the plurality of inertial navigation elements further comprises: at least one gyroscope, configured to measure a rotational motion parameter of the liquid crystal antenna in the 3D direction.

5. The liquid crystal antenna according to claim 1, wherein the antenna array further comprises:
   a first electrode, a first alignment layer, a liquid crystal layer, a second alignment layer and a second electrode which are disposed between the second substrate and the first substrate and sequentially arranged along a direction from the first substrate to the second substrate, and a plurality of patch elements arranged in a matrix and disposed on a side of the first substrate away from the second substrate or a side of the second substrate away from the first substrate.

6. The liquid crystal antenna according to claim 5, wherein the antenna array further comprises spacers disposed between the first substrate and the second substrate, for supporting between the first alignment layer and the second alignment layer.

7. The liquid crystal antenna according to claim 5, wherein the first electrode comprises a plurality of first sub electrodes; and the second electrode comprises a plurality of second sub electrodes.

8. The liquid crystal antenna according to claim 5, wherein materials of the patch elements, the first electrode and the second electrode are high-conductivity metallic materials.

9. The liquid crystal antenna according to claim 1, wherein each of the patch elements has a rectangular shape.

10. The liquid crystal antenna according to claim 1, wherein the antenna array has a shape selected from the group consisting of circular array, square array and octagonal array.

11. A manufacturing method of the liquid crystal antenna according to claim 1, comprising:

forming the antenna array by a semiconductor manufacturing process; and forming the plurality of inertial navigation elements on the side of the second substrate facing the first substrate by a semiconductor manufacturing process and a sacrifice layer process.

12. The manufacturing method of the liquid crystal antenna according to claim 11, wherein forming the plurality of inertial navigation elements on the side of the second substrate facing the first substrate by the semiconductor manufacturing process and the sacrifice layer process comprises:

forming a stacked structure on the side of the second substrate facing the first substrate by the semiconductor manufacturing process, in which the stacked structure comprises a sacrifice layer and a plurality of layers of the plurality of inertial navigation elements, and the sacrifice layer is disposed among the plurality of layers; and removing the sacrifice layer and forming a cavity to form the plurality of inertial navigation elements.

13. The manufacturing method of the liquid crystal antenna according to claim 12, wherein removing the sacrifice layer and forming a cavity to form the plurality of inertial navigation elements comprises:

etching the sacrifice layer by a wet etching process to form the cavity.

14. The manufacturing method of the liquid crystal antenna according to claim 11, further comprising:

forming a seed layer between the second substrate and the plurality of inertial navigation elements.

15. The manufacturing method of the liquid crystal antenna according to claim 11, wherein the material of the sacrifice layer comprises one or more selected from the group consisting of silicon nitride, silicon oxide and silicon oxynitride.

\* \* \* \* \*